(12) United States Patent
Weidinger

(10) Patent No.: US 6,510,933 B1
(45) Date of Patent: Jan. 28, 2003

(54) THRUST PLATE ASSEMBLY

(75) Inventor: Reinhold Weidinger, Unterspiesheim (DE)

(73) Assignee: Mannesmann Sachs AG, Schweinfurt (DE)

( * ) Notice: Subject to any disclaimer, the term of this patent is extended or adjusted under 35 U.S.C. 154(b) by 5 days.

(21) Appl. No.: 09/651,811

(22) Filed: Aug. 30, 2000

(30) Foreign Application Priority Data

Sep. 30, 1999 (DE) .......................................... 199 41 210

(51) Int. Cl.$^7$ .......................... F16D 13/75; F16D 13/71
(52) U.S. Cl. ................................. 192/70.25; 192/109 R
(58) Field of Search ........................ 192/109 R, 70.25, 192/70.27, 89.23, 89.24

(56) References Cited

U.S. PATENT DOCUMENTS

| 4,883,153 | A | * | 11/1989 | Maucher et al. | 192/70.27 |
|---|---|---|---|---|---|
| 5,385,224 | A | | 1/1995 | Uehara | |
| 5,579,881 | A | * | 12/1996 | Weidinger | 192/70.25 |
| 5,823,312 | A | * | 10/1998 | Reik et al. | 192/70.25 |
| 5,906,257 | A | | 5/1999 | Mizukami | |
| 5,979,628 | A | * | 11/1999 | Lampe et al. | 192/70.25 |
| 6,016,897 | A | * | 1/2000 | Bacher | 192/70.27 |
| 6,079,538 | A | * | 6/2000 | de Briel et al. | 192/70.27 |
| 6,109,412 | A | * | 8/2000 | Cole et al. | 192/70.25 |
| 6,109,413 | A | * | 8/2000 | Young | 192/70.25 X |

FOREIGN PATENT DOCUMENTS

| EP | 0 237 144 A1 | 9/1987 | ........... F16D/13/71 |
|---|---|---|---|
| FR | 2 556 799 | * 6/1985 | |
| GB | 2 176 548 | 12/1986 | ........... F16D/13/70 |
| GB | 2 327 720 A | 2/1999 | ........... F16D/13/75 |

* cited by examiner

Primary Examiner—Rodney H. Bonck
(74) Attorney, Agent, or Firm—Cohen, Pontani, Lieberman & Pavane

(57) ABSTRACT

A thrust plate assembly for a motor vehicle friction clutch comprises a housing rotatably arranged for rotating about an axis of rotation and a pressure plate arranged in the housing. The pressure plate is displaceable in the direction of an axis of rotation by a connection arrangement with the housing and is also fixed with respect to rotation relative to the housing. An energy accumulator is arranged between the housing and the pressure plate for applying force to the pressure plate in the direction of the axis of rotation for generating an engaging force. A contact arrangement is arranged at the housing and/or the pressure plate so that the energy accumulator contacts the contact arrangement when the pressure plate reaches a predetermined position. The application of force to the pressure plate by the energy accumulator is at least reduced when the energy accumulator contacts the contact arrangement.

14 Claims, 5 Drawing Sheets

THRUST PLATE ASSEMBLY

BACKGROUND OF THE INVENTION

1. Field of the Invention

The present invention relates to a thrust plate assembly for a friction clutch in a motor vehicle.

2. Description of the Related Art

Thrust plate assemblies for motor vehicle clutches typically comprise a housing with a pressure plate arranged herein. The pressure plate is connected to the housing via a connection arrangement so that the pressure plate is substantially fixed with respect to rotation relative to the housing and axially displaceable relative to the housing. An energy accumulator such as, for example, a diaphragm spring is arranged to act between the housing and the pressure plate, applying a force to the pressure plate in the direction of the axis of rotation for generating an engaging force.

In a thrust plate assembly of the type mentioned above, the connection arrangement between the pressure plate and the housing generally comprises a plurality of tangential leaf springs, as they are called, which have a first end arranged at the housing and a second end arranged at the pressure plate. These tangential leaf springs provide for the desired holding of the pressure plate with respect to the housing. Further, these tangential leaf springs generate a force which biases or pretensions the pressure plate in a direction opposite to the application of force of the energy accumulator.

In modern automotive construction, different vehicle components are delivered by modules and are not assembled until the final assembly phase. This modular procedure also applies to friction clutches in which thrust plate assemblies such as those described above are initially assembled separately, for example, by the manufacturer and are only subsequently combined with a clutch disk and flywheel to complete the friction clutch. In this regard, a basic problem arises in that the energy accumulators generate a relatively large force which presses the pressure plate out of the housing. This large force would have to be absorbed exclusively by the connection arrangement which can produce unwanted excessive deformation of the connection arrangement, especially when the connection arrangement is constructed from the tangential leaf spring elements described above. Therefore, it is known to provide separate transport safety elements at the pressure plate, for example, by which the pressure plate is attached to the housing so that a direct force return is created between the pressure plate and housing when the application of force by the energy accumulator is not opposed by a counterforce through a clutch disk or the flywheel. However, providing a separate transport safety device of this type requires an additional work step and additional components which are sometimes lost or hidden in the clutch, i.e., are not removed or cannot be removed after the clutch is assembled.

SUMMARY OF THE INVENTION

Therefore, it is the object of the present invention to design a thrust plate assembly in such a way that excessive loading of the connection arrangement is avoided without providing additional components.

According to the invention, the object is met by a thrust plate assembly, particularly for a friction clutch in a motor vehicle, comprising a housing, a pressure plate connected to the housing so that it is displaceable in the direction of an axis of rotation and is substantially fixed with respect to rotation relative to the housing. The thrust plate assembly also includes an energy accumulator acting between the housing and the pressure plate for applying a force to the pressure plate in the direction of the axis of rotation for generating an engaging force. A contact arrangement is arranged at the housing and/or the pressure plate so that the energy accumulator contacts this contact arrangement when a predetermined position is reached. The application of force to the pressure plate by the energy accumulator is at least reduced when the energy accumulator contacts the contact arrangement.

The construction of the thrust plate assembly according to the present invention ensures that components which are already provided assume the function of a transport safety device in that the contact of the energy accumulator at the contact arrangement reduces the loading of the pressure plate by the energy accumulator at least to the extent that an unwanted impairment of the connection arrangement is prevented.

For example, the energy accumulator comprises a radial outer supporting area supported at the housing and an application area for applying force to the pressure plate located on the radial inner side of the supporting area. The energy accumulator further comprises a contact area for contacting the contact arrangement located radially inside the application area.

In this embodiment, the contact arrangement is provided at the pressure plate.

In an embodiment of this kind, the thrust plate assembly is preferably constructed such that an application portion is provided at the pressure plate. The energy accumulator is arranged for applying force to the pressure plate via the application portion and the contact portion which the energy accumulator contacts is provided at the pressure plate on a radial inner side of the application portion.

A very simple and reliably acting construction can be achieved in this way when the contact portion comprises a surface region of the pressure plate.

In an alternative embodiment, the energy accumulator may apply force to the pressure plate in a radial outer application area. The energy accumulator is supported at the housing in a supporting area located radially inside the application area, and can contact the contact arrangement in its contact area located radially inside the supporting area.

In this embodiment, the contact arrangement is preferably provided at the housing.

The thrust plate assembly according to the invention may further comprise a supporting portion formed at the housing with the energy accumulator being supported at this supporting portion. A contact portion which the energy accumulator contacts is provided radially inside the supporting portion. In this case, the contact portion preferably comprises a surface region of the housing.

For example, the contact portion at the housing may comprise at least one contact projection.

In modern thrust plate assemblies or friction clutches, a wear compensating adjustment device generally ensures that wear on friction linings of a clutch in the thrust plate assembly which occurs during operation is automatically compensated. However, before the thrust plate assembly is joined with a flywheel and clutch disk to complete the friction clutch, unwanted wear adjustment due to the absence of a supporting force of the pressure plate must be prevented. For this purpose, the present invention further provides that the energy accumulator applies force to the pressure plate via a wear compensating adjustment device which is pretensioned in the wear compensating adjustment direction. Furthermore, a blocking arrangement is associated with the wear compensating adjustment device and prevents wear compensating adjustment in a state in which there is no wear to compensate.

The blocking arrangement may, for example, comprise at least one blocking spring element which opposes the pretensioning of the wear compensating adjustment device in the wear compensating adjustment direction.

As was already mentioned, thrust plate assemblies of the type mentioned above have connection arrangements including a plurality of spring elements, preferably tangential leaf springs, acting between the pressure plate and the housing.

The present invention is further directed to a friction clutch which is outfitted with a thrust plate assembly according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in more detail in the following with reference to the accompanying drawings by preferred embodiment forms.

DETAILED DESCRIPTION OF THE PRESENTLY PREFERRED EMBODIMENTS

Figure 1:
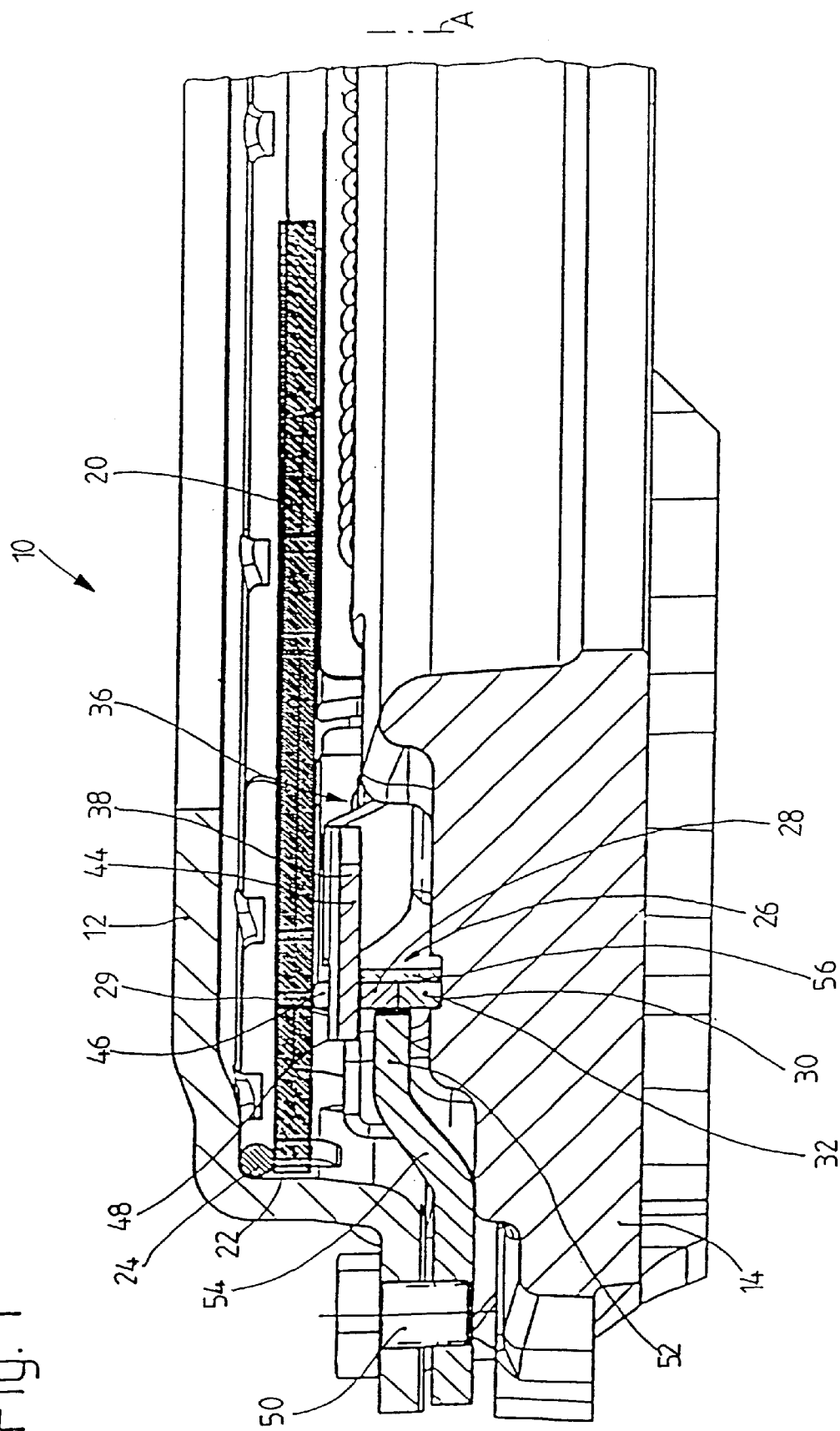
FIG. 1 is a partial longitudinal sectional view of a thrust plate assembly for a friction clutch according to an embodiment of the present invention along line I—I in FIG. 2.
Figure 2:
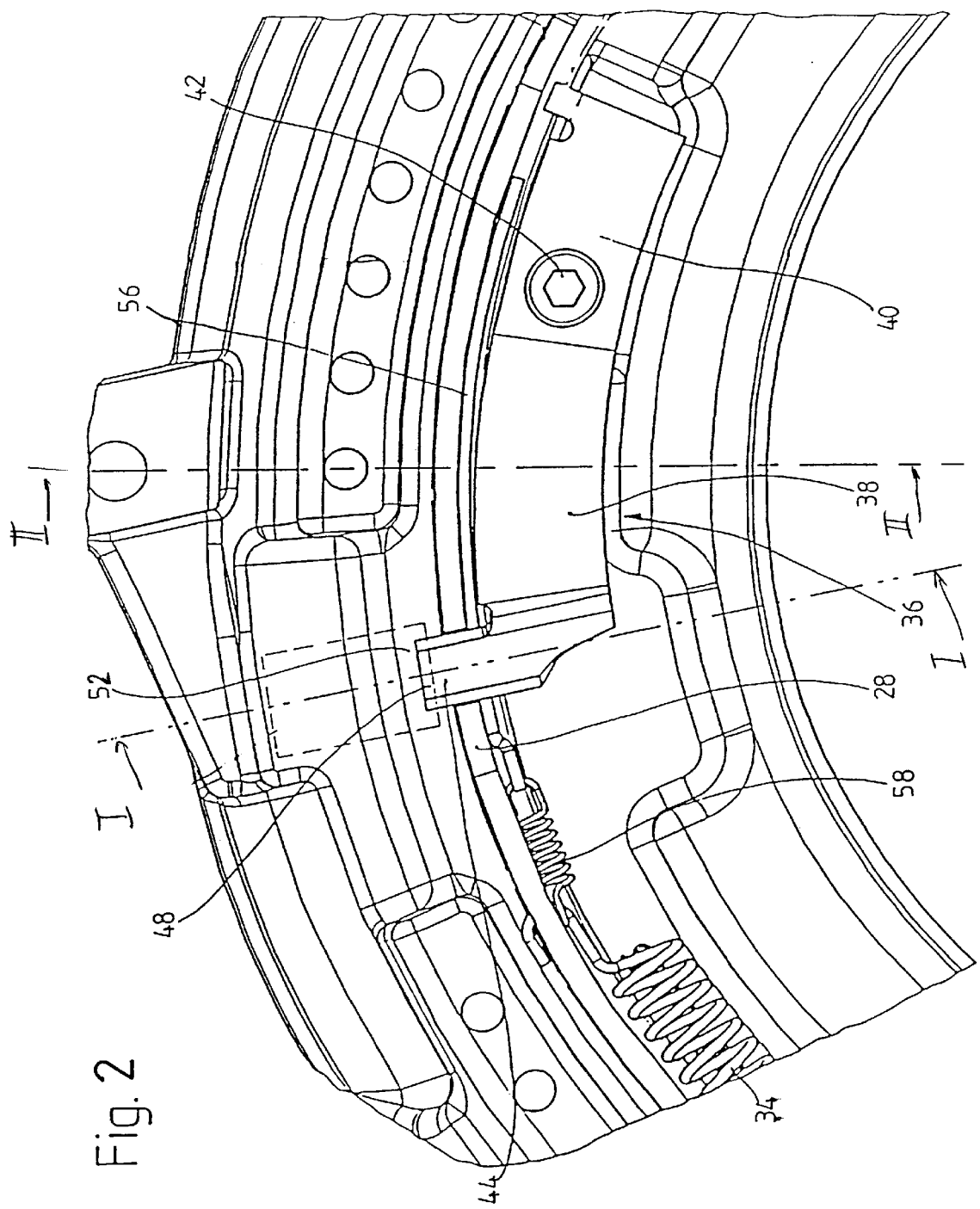
FIG. 2 is an axial view of a circumferential section of the thrust plate assembly of FIG. 1 without a housing.
Figure 3:
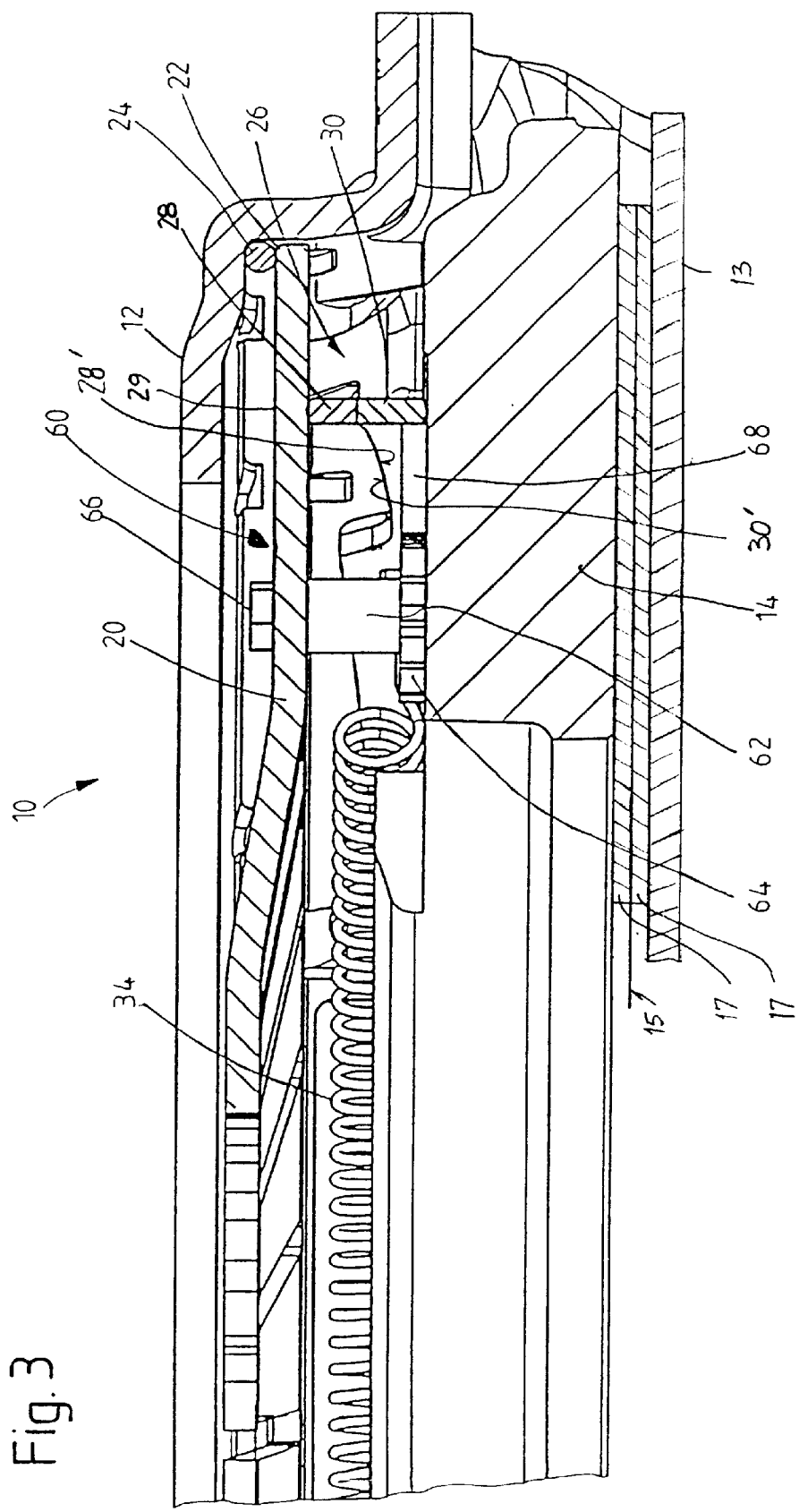
FIG. 3 shows a partial longitudinal sectional view of the thrust plate assembly of FIG. 2 along line II—II.

FIGS. 1—3 show the basic construction of a thrust plate assembly 10 according to the present invention comprising a housing 12 rotatable about and axis of rotation A and a pressure plate 14 arranged in the housing 12. The pressure plate 14 is connected with the housing 12 via a plurality of tangential leaf springs (16a in FIG. 5) which are distributed in the circumferential direction and which have one end fastened to the pressure plate 14 and another end fastened to the housing 12. The tangential leaf springs may, for example, be fastened by rivet bolts (18a in FIG. 5) or other mechanical connection. The tangential leaf springs extend approximately in the circumferential direction or tangential to the circumferential direction. The tangential leaf springs form a connection arrangement for connecting the pressure plate 14 with the housing 12 so that the pressure plate 14 is movable with respect to the housing 12 in the direction of the axis of rotation A and is substantially fixed with respect to rotation relative to the housing 12 in the circumferential direction. An energy accumulator 20 shown in the form of a diaphragm spring acts between the pressure plate 14 and the housing 12. A supporting area 22 on the radially outer side of the diaphragm spring 20 is supported at the housing 12 via a support ring 24. An application area 29 acts on the pressure plate 14 via a wear compensating adjustment device 26. As illustrated in FIG. 1, the application area 29 is located radially inside the supporting area 22 because, in this embodiment form, the thrust plate assembly 10 is provided for the construction of a pull type clutch.

The wear compensating adjustment device 26 comprises first and second adjusting rings 28, 30. The second adjusting ring 30 is supported directly in a recess 32 of the of the pressure plate 14 so that the second adjusting ring 30 is guided in the recess 32. The first adjusting ring 28 is acted upon by the application area 29 of the diaphragm spring 20. As is shown in FIG. 3, the first and second adjusting rings 28, 30 have mutually opposing inclined surfaces 28', 30' that slide along one another when the two adjusting rings 28, 30 rotate relative to one another about the axis of rotation A. The inclined surfaces 28', 30' are arranged so that the total axial extension of the adjusting device 26 changes when the first and second adjusting rings 28, 30 rotate relative to one another.

The first and second adjusting rings 28, 30 are pretensioned with respect to rotation relative to one another by a pretensioning spring 34 connected between the first and second adjusting rings 28, 30. The pretensioning by the spring 34 is effected so that the rings 28, 30 are pretensioned toward movement in a wear compensating adjustment direction, i.e., in a direction in which the rings 28, 30 are rotated relative to one another in such a way that the total axial extension of the adjusting device 26 is increased, as was mentioned above.

The thrust plate assembly 10 further comprises at least one play transmitter arrangement 36. This play transmitter arrangement 36 comprises a spring element 38 having a first end region 40 secured to the pressure plate 14 by a screw 42 or other mechanical connection. The first end region 40, as can be seen in FIG. 1, extends in the circumferential direction proceeding from this fastening area. A blocking projection 44 of the spring element 38 extends radially outward and engages in a recess 46 of the first adjusting ring 28. This arrangement holds the first adjusting ring 28 so that it is fixed with respect to rotation relative to the pressure plate 14. The radial outermost portion 48 of the spring element 38, i.e., the radial outermost ends of the blocking projection 44, engages over a stop element 52 that is fastened to the housing 12 by a screw bolt 50 or other mechanical connection. The stop element 52 extends from the fastening area at the housing 12 along a bent area 54 to the radial outermost portion 48 of the spring element 38.

FIGS. 1 and 2 further show a wedge-like blocking element 56 which is positioned in the same circumferential area as the projection 44 of the spring element 38. The wedge-like blocking element 56 is pretensioned by a spring 58 toward movement in the circumferential direction. The spring 58 has one end attached to the pretensioning spring 34. More specifically, the spring is attached to the end of the pretensioning spring 34 which is connected with the second adjusting ring 30. The wedge-like blocking element 56 is constructed so that its axial extension length increases proceeding from the area of the blocking element 56 to which the spring 58 is connected.

As illustrated in FIG. 3, the housing 12 may be connected with a flywheel 13 and a clutch disk 15 with friction linings 17 is arranged between the pressure plate 14 and the flywheel 13 when the thrust plate assembly 10 is assembled in a motor vehicle friction clutch.

Operation of the thrust plate assembly 10 according to the present invention and a friction clutch outfitted therewith will be described in the following in relation to compensation of wear. It is noted in this regard that the radial outer area of the housing 12 of the thrust plate assembly 10 is, for example, fixedly connected to flywheel 13 and a friction clutch with its friction linings 17 is positioned between this flywheel 13 and the pressure plate 14.

When wear occurs during operation of the clutch, for example, during engagement or disengagement operation of the clutch, the pressure plate 14 moves toward the flywheel, i.e., away from the housing 12 because the clutch disk becomes thinner in the area of its friction linings. When this movement of the pressure plate 14 due to wear is so large that the projection 44 of the spring element 38 abuts at the stop 52, the spring element 38 with its projection 44 is prevented from following a further movement of the pressure plate 14 toward the flywheel. When the pressure plate 14 does move further toward the flywheel, the spring element 38 is accordingly lifted off the first adjusting ring 28 by the projection 44 and the axial distance between the projection 44 and the pressure plate 14 is accordingly increased. The increased axial distance allows the wedge-like blocking element 56 to be displaced under the urgency of the spring 58. Accordingly, the wedge-like blocking element 56 prevents the projection 44 from moving back toward the pressure plate 14 during a subsequent clutch release process in which this projection 44 moves away from the stop 52 again. Therefore, an axial intermediate space initially remains between the projection 44 and the first adjusting ring 28 when wear occurs.

In the engaged state of a clutch, the energy accumulator 20, hereafter referred to as the diaphragm spring 20, acts on the first adjusting ring 28. Accordingly, compensation of wear through rotation of the second adjusting ring 30 which is freely rotatable with respect to the pressure plate 14 cannot occur in the engaged state. In the disengaging process, the radial inner area of the diaphragm spring 20 is pulled away from the flywheel and cancels the application of force on the first adjusting ring 28, and therefore on the adjusting device 26. When the diaphragm spring 20 is pulled away from the flywheel, only a pretensioning force of the tangential leaf springs or other connector between the pressure plate 14 and the housing 12 remains for urging the pressure plate 14 toward the diaphragm spring 20. However, this pretensioning force is not sufficient to prevent the first and second adjusting rings 28, 30 from executing a relative rotation with respect to one another. This relative rotation continues until the first adjusting ring 28 again abuts against the projection 44 of the spring element 38, so that the wear that has previously taken place is compensated for exactly.

After a clutch disk is completely worn and is replaced by a new clutch disk, the wear compensating adjustment device 26 must be brought back to a state associated with no wear on the clutch disk. A restoring arrangement 60 may be arranged on the thrust plate assembly 10 to bring the wear compensating adjustment device 26 again into a state associated with no wear of the clutch disk, as is shown in FIG. 3. The restoring arrangement 60 comprises a restoring element 62 which is rotatably arranged at the pressure plate 14 with a toothed wheel portion 64 and an actuation portion 66 which penetrates through an opening in the diaphragm spring 20. Another toothed area 68 is arranged on the second adjusting ring 30 and is arranged in meshed engagement with the toothed wheel portion 64. The toothed area 68 extends in the circumferential direction. When the actuation portion 66 is rotated, for example, by a wrench or other tool, the toothed portion 64 rotates therewith. The rotation of the toothed wheel portion 64 moves the toothed area 68 in the circumferential direction via the meshed engagement. The second adjusting ring 30 simultaneously moves with the toothed area 68 in the circumferential direction against the pretensioning of the pretensioning ring 34 so that the inclined surface regions 28', 30' of the first and second adjusting rings 28, 30 which rest against one another slide along one another to reduce the axial extension of the wear compensating adjustment device 26.

Figure 4:
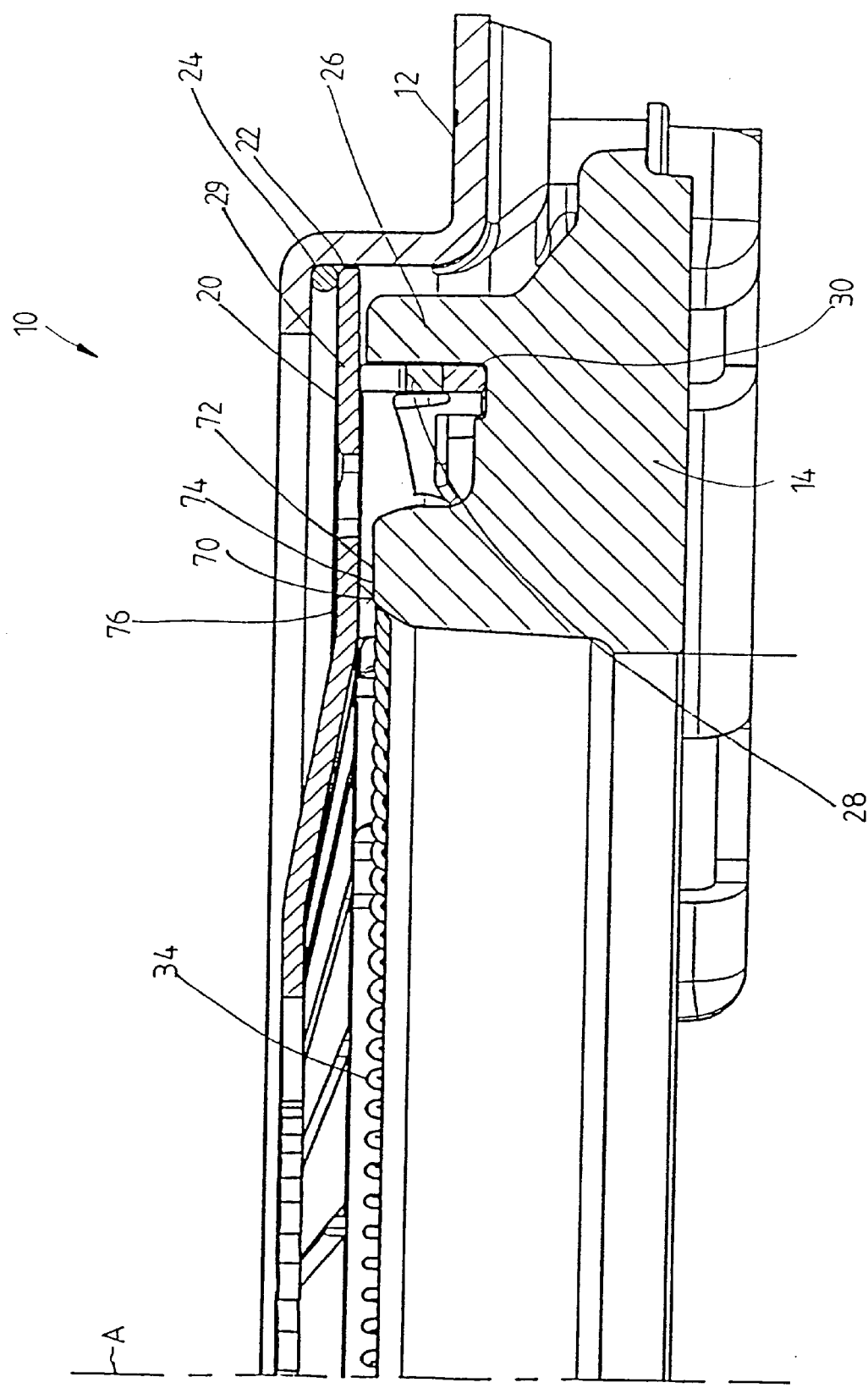
FIG. 4 Is another partial view in longitudinal section of the thrust plate assembly according to the present invention showing a first embodiment form of the transport safety device in a pull type clutch.
Figure 5:
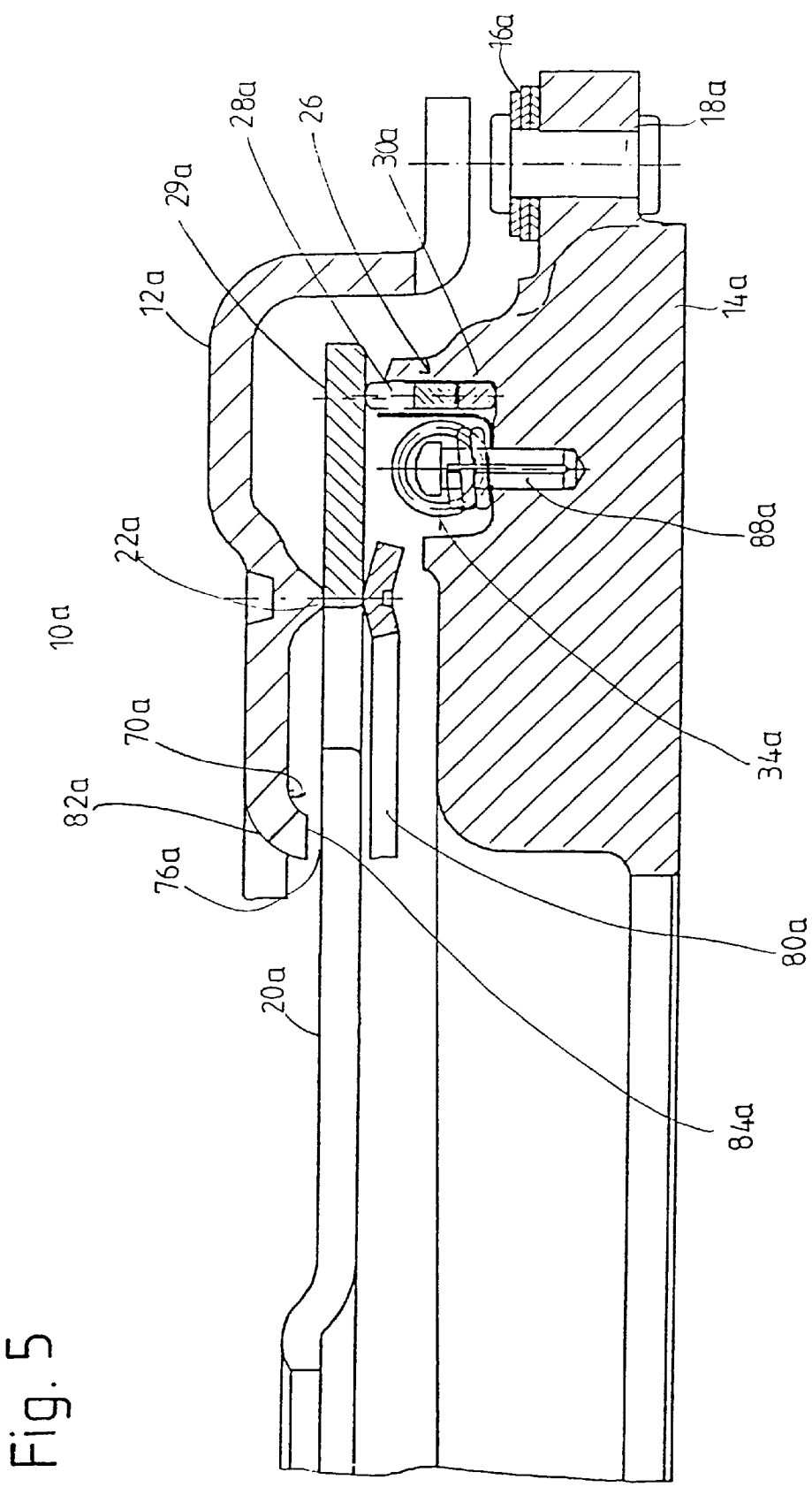
FIG. 5 is a view corresponding to FIG. 4 showing a further embodiment of a transport safety device in a push type clutch.

In thrust plate assemblies of the type mentioned above, excessive loading of the tangential leaf springs (16*a* in FIG. 5) which form a connection arrangement between the pressure plate 14 and the housing 12 must be prevented before the thrust plate assembly is combined with a flywheel. The excessive loading is possible because the pressure plate 14 has no point of abutment before the thrust plate assembly is assembled in a friction clutch and the force which is generated by the diaphragm spring 20 and applied to the pressure plate 14 would therefore have to be absorbed entirely by the tangential leaf springs 16*a* (FIG. 5). To avoid this, a contact arrangement 70 is arranged at the pressure plate 14 in the thrust plate assembly 10 according to the invention as shown in FIG. 4. The contact arrangement 70 comprises a projection area 72 at the pressure plate 14 which projects axially away from the flywheel and toward the diaphragm spring 20. The projection area 72 may, for example, extend continuously around in the circumferential direction or may comprise a circumferential portion or plurality of circumferential portions. An axial surface 74 of the projection area 72 forms a contact portion for receiving a contact area 76 of the diaphragm spring 20. Accordingly, if there is no abutment for the pressure plate 14 such as before the thrust plate assembly is assembled in a friction clutch, the application area 29 of the diaphragm spring 20 urges the pressure plate 14 away from the housing 12 along the direction of the axis of rotation A in FIG. 4. In so doing, the diaphragm spring 20 is deformed and the pressure plate 14 finally arrives in an actuation position in which the contact area 76 of the diaphragm spring 20 abuts axially against the axial surface 74 of the contact arrangement 70. Accordingly, there is additional contact for the pressure plate 14 so that, as a result, the force which is now exerted by the diaphragm spring 20 on the pressure plate 14 and which acts in the direction of the axis of rotation is appreciably reduced because of the changing lever ratios and the changing installation position of the diaphragm spring 20. However, this clearly reduced force can now be absorbed by the tangential leaf springs as seen in FIG. 5 without damaging them.

In this state, in which there is ultimately no abutment for the pressure plate 14, the adjusting rings 28, 30 of the wear compensating adjustment device 26 are axially clamped between the pressure plate 14 and the spring element 38 (not shown in FIG. 4). Accordingly, unwanted compensating movements are prevented.

It is noted that in the pull-type clutch as shown in FIG. 4, the contact arrangement 70 may alternatively be formed by a hook-like projection which proceeds from the housing 12 and which penetrates the diaphragm spring 20 and can act at the side of the diaphragm spring 20 facing the flywheel or pressure plate to block further movement of the diaphragm spring 20. In this case, a complete force return would be created via the housing 12, so that the tangential leaf springs would be completely relieved when this actuation position was reached.

An alternative embodiment form of a thrust plate assembly according to the invention is shown in FIG. 5. Components which correspond with respect to construction and function to the components described in the preceding are designated by the same reference numbers supplemented by the suffix "a". As evident from FIG. 5, the thrust plate assembly 10a is designed as a push type clutch. The application area 29a of the diaphragm spring 20a is arranged radially outside of a supporting area 22a for supporting or holding the diaphragm spring 20a at the housing 12a. The support of the diaphragm spring 20a at the housing is known and may be effected via knife-edge portions, spacer pins, supporting rings 80a as shown in FIG. 5, or other supports. A contact area 76a of the diaphragm spring 20a is arranged radially inside the supporting area 22a. A contact arrangement 70a is located opposite from the contact area 76a at the housing 12a. The contact arrangement 70a comprises a plurality of projections 82a which are arranged successively in the circumferential direction and which are bent axially away from the housing 12a and form, along with surface portion 84a, an abutment for the diaphragm spring 20a. When the diaphragm spring 20a now presses the pressure plate 14a away from the housing 12a along the axis of rotation, the contact area 76a of the diaphragm spring 20a comes into contact with the projections 82a when the pressure plate 14a reaches an abutment position. At this point, the diaphragm spring 20a is prevented from executing a continued swiveling movement. As a result, a force return is effected via the housing 12a and the tangential leaf springs 16a are completely relieved. The pressure plate 14a is then pretensioned axially toward the application area 29a of the diaphragm spring 20a with the wear compensating adjustment device 26a by the pretensioning action generated by the tangential leaf springs 16a. This pretensioning prevents an unwanted wear adjustment or compensation by the spring element, not shown in this Figure (see spring element 38 in FIG. 1).

In an alternative modification to the embodiment of FIG. 5, one or more contact projections may proceed axially from the pressure plate 14a and penetrate the diaphragm spring 20a, so that the diaphragm spring 20a contacts these contact projections at the side facing away from the pressure plate 14a. In this case, a force return preventing the further movement of the diaphragm spring 20a is provided via the wear compensating adjustment device 26a and pressure plate 14a.

It is noted that FIG. 5 shows that a pretensioning spring 34a for pretensioning the first and second adjusting rings 28, 30 may have an end secured areas to the pressure plate 14a by a fastening pin 88a and can engage by its other end area at the rotatable adjusting ring, i.e., at the second adjusting ring 30a. Engagement at the first adjusting ring 28a, which is not rotatable per se, is not necessarily required.

Before, the thrust plate assembly 10, 10a is installed in a friction clutch, a strong shaking of the thrust plate assembly 10, 10a such as, for example, the impact which occurs when the thrust plate assembly has been dropped may temporarily lift off the spring element and lead to an unwanted relative rotation of the adjusting rings 28a, 30a. The restoring arrangement 60 shown in FIG. 3 ensures that a state of the wear compensating adjustment device 26a can be returned to a position corresponding to a wear-free state of a clutch disk even after such an unwanted relative rotation of the adjusting rings 28a, 30a.

Furthermore, the thrust plate assembly according to the present invention may have play transmitters or play transmitter arrangements as well as wear compensating adjustment arrangements of any construction. Accordingly, it is not necessary to provide two rings which are rotatable relative to one another. One ring that can slide at the corresponding inclined surfaces of the pressure plate is sufficient. Also, individual wedge elements or disk elements can assume the function of a ring of this type. It is further noted that the manner of functioning of the transport safety device, according to the invention, which is provided by the contact arrangement and which essentially provides for relieving the tangential leaf springs which form a connection arrangement may be used regardless of whether any wear compensating adjustment device is provided at all.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A thrust plate assembly for a motor vehicle friction clutch, comprising:

a housing operatively arranged for rotating about an axis of rotation;

a pressure plate arranged in said housing and operatively connected to said housing via a connection arrangement so that said pressure plate is axially displaceable relative to said housing and fixed with respect to rotation relative to said housing;

an energy accumulator arranged between said housing and said pressure plate for applying a force to said pressure plate along said axis of rotation for generating an engaging force;

a contact arrangement operatively arranged on one of said housing and said pressure plate, wherein said energy accumulator contacts said contact arrangement when said pressure plate is moved under the urgency of the energy accumulator to an abutment position, and wherein an application of force by said energy accumulator to said pressure plate is reduced when said energy accumulator contacts said contact arrangement such that the reduced application of force by said energy accumulator in the abutment position is absorbed by said connection arrangement; and a wear compensating adjustment device pretensioned in a wear compensating adjustment direction and arranged between said energy accumulator and said pressure plate such that said energy accumulator applies a force to said pressure plate via said wear compensating adjustment device, and a blocking arrangement arranged with said wear compensating adjustment device for preventing adjustment of said wear compensating adjustment device when said energy accumulator is in said abutment position and in a state in which there is no wear to be compensated for.

2. The thrust plate assembly of claim 1, wherein said energy accumulator comprises a supporting area supported at said housing and arranged at a radially outer area of said energy accumulator, an application area for applying force to the pressure plate arranged on a radial inner side of said supporting area, and a contact area at which said energy accumulator contacts said contact arrangement located radially inside said application area.

3. The thrust plate assembly of claim 2, wherein said contact arrangement is arranged at said pressure plate.

4. The thrust plate assembly of claim 1, wherein said pressure plate comprises an application portion for receiving the engaging force applied by said energy accumulator and wherein said contact arrangement comprises a contact portion arranged on said pressure plate on a radially inner side of said application portion, said energy accumulator contacting said contact portion when said pressure plate reaches said abutment position.

5. The thrust plate assembly of claim 4, wherein said contact portion comprises a surface region of said pressure plate.

6. The thrust plate assembly of claim 1, wherein said energy accumulator comprises an application area arranged at a radially outer end of said energy accumulator for applying force to said pressure plate for generating said engaging force, a supporting area arranged radially inside of said application area supported at said housing, and a contact area arranged radially inside of said supporting area for contacting said contact arrangement when said pressure plate is in said abutment position.

7. The thrust plate assembly of claim 6, wherein said contact arrangement is arranged at said housing.

8. The thrust plate assembly of claim 6, wherein said housing comprises a supporting portion for supporting said energy accumulator and wherein said contact arrangement comprises a contact portion arranged on said housing for contacting said energy accumulator when said pressure plate is in said abutment position, said contact portion being arranged radially inside of said supporting portion.

9. The thrust plate assembly of claim 1, wherein said housing comprises a supporting portion for supporting said energy accumulator and wherein said contact arrangement comprises a contact portion arranged on said housing for contacting said energy accumulator when said pressure plate is in said abutment position, said contact portion being arranged radially inside of said supporting portion.

10. The thrust plate assembly of claim 9, wherein said contact portion comprises a surface region of said housing.

11. The thrust plate assembly of claim 9, wherein said contact portion comprises a contact projection arranged on said housing.

12. The thrust plate assembly of claim 1, wherein said blocking arrangement comprises at least one blocking spring element operatively arranged for opposing the pretensioning of the wear compensating adjustment device in the wear compensating adjustment direction.

13. The thrust plate assembly of claim 1, wherein said connection arrangement between said pressure plate and said housing comprises a plurality of spring elements acting between said pressure plate and said housing.

14. A friction clutch comprising a flywheel, a clutch disk, and a thrust plate assembly, wherein said thrust plate assembly comprises:

a housing operatively arranged for rotating about an axis of rotation;

a pressure plate arranged in said housing and operatively connected to said housing via a connection arrangement so that said pressure plate is axially displaceable relative to said housing and fixed with respect to rotation relative to said housing;

an energy accumulator arranged between said housing and said pressure plate for applying a force to said pressure plate along said axis of rotation for generating an engaging force; and a contact arrangement operatively arranged on one of said housing and said pressure plate, wherein said energy accumulator contacts said contact arrangement when said pressure plate is moved under the urgency of the energy accumulator to an abutment position, and wherein an application of force by said energy accumulator to said pressure plate is reduced when said energy accumulator contacts said contact arrangement such that the reduced application of force by said energy accumulator in the abutment position is absorbed by said connection arrangement; and a wear compensating adjustment device pretensioned in a wear compensating adjustment direction and arranged between said energy accumulator and said pressure plate such that said energy accumulator applies a force to said pressure plate via said wear compensating adjustment device, and a blocking arrangement arranged with said wear compensating adjustment device for preventing adjustment of said wear compensating adjustment device when said energy accumulator is in said abutment position and in a state in which there is no wear to be compensated for.

* * * * *